United States Patent [19]

Credali et al.

[11] 4,129,559

[45] Dec. 12, 1978

[54] REVERSE OSMOSIS ANISOTROPIC MEMBRANES BASED ON POLYPIPERAZINE AMIDES

[75] Inventors: Lino Credali, Casalecchio (Bologna); Giovanni Baruzzi, Ferrara; Vincenzo Guidotti, Milan, all of Italy

[73] Assignee: Montedison S.p.A., Milan, Italy

[21] Appl. No.: 626,289

[22] Filed: Oct. 28, 1975

Related U.S. Application Data

[63] Continuation of Ser. No. 433,087, Jan. 14, 1974, abandoned.

[30] Foreign Application Priority Data

Jan. 16, 1973 [IT] Italy .................................. 19247 A/73

[51] Int. Cl.² ...................... C08G 69/26; B01D 39/16
[52] U.S. Cl. .................................. 528/337; 210/23 H; 210/500 M; 260/30.2; 260/30.8 R; 260/30.8 DS; 260/32.6 NA; 264/203; 264/212; 578/339; 578/341
[58] Field of Search .................. 260/78 R; 210/500 M

[56] References Cited

U.S. PATENT DOCUMENTS

| | | | |
|---|---|---|---|
| 3,664,986 | 5/1972 | MacDonald | 260/78R |
| 3,687,842 | 8/1972 | Credali et al. | 210/23 |
| 3,696,031 | 10/1972 | Credali et al. | 210/23 |
| 3,935,172 | 1/1976 | Vogl et al. | 260/78 R |

OTHER PUBLICATIONS

The Condensed Chemical Dictionary, Eighth Edition, p. 64.

*Primary Examiner*—Harold D. Anderson
*Attorney, Agent, or Firm*—Hubbell, Cohen, Stiefel & Gross

[57] ABSTRACT

Disclosed are reverse osmosis anisotropic gel-type membranes having the structure:

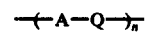

wherein n is a whole number; A is a divalent group derived from piperazine and having the structure:

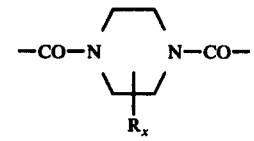

wherein x is 0 to 8 and R is an alkyl group, and Q is at least two divalent organic groups selected from the group consisting of:

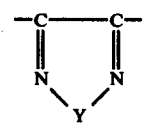

wherein Y is O or S,

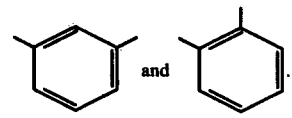

Also disclosed are processes for preparing such membranes.

6 Claims, No Drawings

REVERSE OSMOSIS ANISOTROPIC MEMBRANES BASED ON POLYPIPERAZINE AMIDES

CROSS REFERENCE TO RELATED APPLICATIONS:

This is a continuation, of application Ser. No. 433,087, filed Jan. 14, 1974, now abandoned.

BACKGROUND OF THE INVENTION

1. Field of the Invention

This invention relates to reverse osmosis anisotropic membranes obtained from polymeric polyamide materials based on piperazine, and to a process for preparing such membranes.

2. Description of the Prior Art

Membranes having selective permeability have been known for a long time. The principle of reverse osmosis is also known. According to the reverse osmosis principle, when a solution of one or more substances, dissolved in a common solvent, is pumped against a permoselective membrane, at a pressure higher than the osmotic pressure of the solution, it becomes possible to separate the components of the solution.

Moreover, the principle of reverse osmosis has been industrially applied for many years to the desalting of brackish waters and sea water.

In order to effect such a process, it is necessary to utilize membranes capable of allowing the passage of water and of rejecting the salts dissolved therein.

To permit profitable utilization, the reverse osmosis membranes must allow a substantial flow of water therethrough and must also strongly reject the dissolved salts. The membranes suited to such use may exhibit different physical structures. In fact, the polymeric material forming the membrane may have:

(1) a dense and homogeneous structure, either in the form of a supported ultra-thin layer or in the form of a hollow fiber; or (2) a non-homogeneous structure in the form of "anisotropic gel" (or "skinned") membranes, consisting of a dense and homogeneous superficial polymeric layer generally of 0.1–0.2 μ thickness or less, and of a porous understructure which provides a support for the thin layer.

As is known, the high permeability of the anisotropic gel or skinned membranes to the passage of water is due to the thin superficial layer, on which the desalting capacity of the membrane also depends. The term "anisotropic" means that the homogeneous layer, which effects the desalting, is present only on one of the two faces of the membrane.

The polymeric material most widely used for preparing anisotropic membranes is cellulose acetate; in fact, cellulose acetate membranes are those which are generally employed in conventional reverse osmosis processes.

In addition to cellulose acetate, few polymeric materials are known that are capable of providing skinned membranes suited to allow a high flow of water and a strong saline rejection.

U.S. Pat. Nos. 3,687,842 and 3,696,031 both owned by the assignee of this application disclose that polyamides derived from piperazine may be usefully employed for preparing water desalting membranes, according to the reverse osmosis processes.

The polymers described in these patents may be transformed into non-anisotropic membranes of the gel-type which do not, however, exhibit entirely satisfactory characteristics.

Thus, it is an object of this invention to provide reverse osmosis anisotropic membranes based on polypiperazine amides and processes for preparing same which are free from the above mentioned disadvantages.

BRIEF DESCRIPTION OF THE DRAWING

The drawing is a graphical representation of the results of tests comparing the membranes according to the invention and a conventional membrane.

SUMMARY OF THE INVENTION

The foregoing objects are achieved according to the invention, which provides reverse osmosis skinned membranes, based on polypiperazine amides, having a structure defined by general formula

wherein:
n is a whole number sufficiently high to impart to the polymer a molecular weight suitable for the formation of a membrane;

—A— is a divalent organic radical having the structure (II):

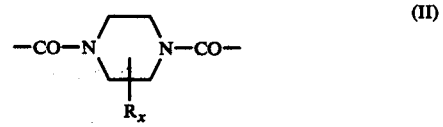

wherein:

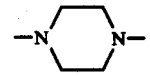

is a divalent radical derived from a piperazine ring;
x is a whole number between 0 and 8, and R is an alkyl group preferably, methyl or ethyl;
said —R groups, when present in the piperazine ring in a number greater than 1, being positioned in any steric position with respect to the ring, thus, said piperazine ring includes the pure stereoisomers (cis-trans), as well as mixtures thereof; and
—Q— is a mixture of at least two divalent organic radicals selected from the group consisting of:

wherein Y is O or S;

and;

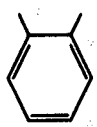
(V)

with the proviso that the —Q— groups comprise at least 5 mol % of structure (III).

These polypiperazine amides may be obtained by poly-condensation of the corresponding dichlorides of the dicarboxylic acids with piperazine or alkyl-substituted piperazines according to methods well known to those skilled in the art.

Such polyamides are characterized by an inherent viscosity (measured at 30° C. in a solution containing 0.5 g of polymer in 99.5 g of 98% sulphuric acid) generally higher than 0.5 and preferably between 1 and 6.

The membranes according to this invention have an anisotropic structure characterized by a dense and homogeneous layer which allows a high saline rejection, and by a porous understructure which acts as a support.

The membranes of the type hereinabove described are prepared by a process according to the invention which comprises, in order, the following steps:
1. Preparation of a solution of the polypiperazine amide in a suitable organic solvent;
2. Spreading the solution on a flat glass plate;
3. Partial evaporation of the solvent;
4. Coagulation of the membrane by immersion in water; and
5. Heat treatment of the membrane.

1. Preparation of a solution of the polypiperazine amide in a suitable organic solvent.

The polyamide concentration in the solution may vary over a wide range, generally between 5 and 60%, and preferably between 8 and 25% by weight with respect to the total weight of the solution.

For preparing the solution, use is made of organic, water soluble, polar solvents, belonging to class m of the solvents which form hydrogen bonds (m -H bonding groups), having a solubility parameter $\sigma > 8$ (cal/cc)$^{\frac{1}{2}}$, according to the classification given by H. Burrell in Polymer Handbook, IV — 341, J. Brandrup, E. N. Immergut, Editors, Interscience, N.Y. Examples of such solvents are dimethylformamide, dimethylacetamide, diethylformamide, diethylacetamide, dimethyl sulfoxide, N-methyl pyrrolidone, tetramethylsulfone and the like.

Preferred solvents are N-methyl pyrrolidone and dimethylacetamide.

A salt soluble in both water and the organic solvent may be present as a third component of the solution. Examples of these salts are LiCl, LiNO$_3$, LiBr, CaCl$_2$, ZnCl$_2$, MgCl$_2$, MgClO$_4$ and the like. In addition to the third component, water may be present as a fourth component of the solution.

Generally the salt, if present, is contained in the solution in large amounts. Thus, the salt may be present in an amount to give a polymer/salt weight ratio between 1 to 2.

The solution may be prepared according to various methods, for instance by using a mechanical mixer of the Werner and Pfleiderer type, and then filtered through a porous septum or a filtering membrane, or other filtering systems.

The characteristics of the membranes prepared starting from this solution depend to a great extent on the quality of the solution prepared.

Particularly favorable results are attained by treating the solution, regardless of how it is prepared, at a temperature higher than 70° C. and generally at temperatures between 80° C. and the solvent boiling or degradation temperature.

2. Spreading the solution on a flat glass plate.

The solution obtained in the first step is spread on a flat glass plate, for example by means of a film-spreader, so as to form a film.

The spreading is generally carried out at room temperature and the thickness of the resulting film may vary over a wide range, usually between 0.002 and 0.2 cm.

In order to increase the flow of the solution during the spreading step, it may be useful to heat the solution to a temperature higher than room temperature. In this way it becomes possible to obtain membranes having a flat form.

As a casting support other than glass, any other material may be used, such as, a metal plate, a polyethyleneterephthalate film, a polytetrafluoroethylene film, porous carriers, woven or non-woven cloths, paper and other similar materials, either in flat, tubular or other shapes.

3. Partial Evaporation of the Solvent.

The membrane, after being cast onto the glass plate, is heated in order to partially evaporate the solvent.

Both the time and temperature of the solvent evaporation may vary over a wide range, depending on the type of solvent used, the composition of the solution and the thickness of the membrane to be obtained.

The evaporation temperature ranges from 70° C. to 200° C., preferably from 80° to 180° C.

The evaporation time is generally between 1 minute and 3 hours, preferably between 3 and 30 minutes.

4. Coagulation of the Membrane by immersion in water.

After partial evaporation of the solvent, the membrane is coagulated to form a gel-type structure by immersion in water.

The temperature of the coagulation bath generally ranges from 0° to 30° C., preferably, from 0° to 5° C.

Sometimes it may be useful to use an aqueous saline solution as a coagulating bath. The salts that may be dissolved in water to form such a bath are: NaCl, CaCl$_2$ and other like salts. Organic, water soluble solvents, such as alcohols, acetone and the like, may sometimes be advantageously added to the coagulating bath.

The coagulation time may vary over a wide range; usually the membranes are kept in the coagulation bath at a temperature between 0° and 5° C. for about 60 minutes, after which they are preserved in water at room temperature.

5. Heat Treatment of the Membrane.

The membranes according to the invention, as obtained from the fourth step, while operative, do not exhibit completely satisfactory reverse osmosis characteristics. The flow ratio of such membranes is very high, generally above 500 liter/sq.m.d., but the saline rejection is generally below 80%; moreover, under the effect of the reverse osmosis pressure, the membranes rapidly lose their saline rejection capacity.

The heat treatment step of the process according to the invention causes a considerable and lasting improvement in the desalting capacity of the membranes.

The membrane can be heat-treated according to various methods; a preferred method consists of placing the membrane in hot water for a time ranging from 1 minute to 5 hours at a temperature between 60° and 100° C.

When choosing the treatment time and temperature for the heat treatment, it must be borne in mind that an increase in both time and temperature generally causes an increase in the saline rejection and a reduction in the water flow rate.

The present invention relates mainly to skinned, flat membranes; it is to be understood however, that membranes according to this invention may be prepared in a tubular shape, or in the form of hollow fibers by adopting the techniques well known to those skilled in the art.

According to the process of the invention, skinned membranes are prepared, which are characterized by a surface capable of rejecting the salts in a reverse osmosis process, and by a porous understructure allowing a high water flow therethrough.

The anisotropic structure of these membranes may be evidenced by means of two reverse osmosis tests. In the first test the membrane is placed into a reverse osmosis cell, with its dense and homogeneous face turned to the saline solution to be treated. The membrane exhibits a high water flow and a very high saline rejection.

In the second test, a membrane of the same type is placed into a reverse osmosis cell, with its porous face turned to the saline solution to be treated; in this case the membrane still exhibits a high water flow, but the saline rejection is practically nil.

The gel-type structure of these membranes is evidenced by their high water content, which is always above 20% by weight and generally varies from 40 to 80% by weight.

The permeability of the membranes to water may be defined as follows:

$$\text{water flow} \atop (l/sq.m.d) = \frac{\text{water passed through (liters)}}{\text{membrane surface} \times \text{time} \atop (sq.m.) \qquad (days)}$$

or it may be defined in terms of the membrane constant A as follows:

$$\text{membrane constant } A \atop (l/sq.m./d.atm.) = \frac{\text{water flow } (l/sq.m.d)}{\text{effective pressure applied} \atop (atm.)}$$

wherein "effective pressure applied" means the difference ($\Delta P - \Delta \pi$), in which $\Delta P$ is the difference of the hydraulic pressure applied to each of the two faces of the membrane, and $\Delta \pi$ is the difference between the osmotic pressure of the fed solution and that of the solution which has passed through the membrane.

Generally the membranes of this invention are characterized by a high membrane constant.

For example, membranes having a saline rejection above 99%, which enables one to desalt sea water in one single pass, can be obtained, according to this invention, with a membrane constant higher than 3.2 l/sq.m. d. atm. (corresponding, under an applied pressure of 80 atm. and with a feed of 35,000 ppm of NaCl, to a flow of about 200 l/sq.m. d.); or membranes having a saline rejection higher than 90%, and suitable for desalting brackish waters, having a membrane constant higher than 8.3 l/sq.m. d. atm. (corresponding, under a pressure of 80 atm. and with a feed of 10,000 ppm of NaCl, to a flow of about 600 l/sq.m. d.).

The osmotic pressure (in atm.) for a NaCl solution, may be calculated approximately by means of the equation $\pi = 8.2 \times C_1$, wherein $C_1$ is the saline concentration of the solution in % by weight.

As is known, the efficiency of a membrane is higher, the higher its membrane constant and its saline rejection.

The membranes of the invention allow one to obtain in a single pass, desalted waters (having a salt content below 500 ppm) starting from brackish waters or sea water, with desirable water flow values.

Moreover, for certain treatments, it may be more convenient to obtain membranes with very high flow rates and a lower saline rejection rate.

Thus, it is possible to obtain membranes with an A constant between 50 and 90 l/sq.m. d. atm. and a saline rejection between 50 and 90%.

The membranes of this invention exhibit a particular resistance to compaction resulting from the applied pressure, which permits then to be used for a long time; this particularly high impact strength makes the membranes highly suited for the desalting of sea water, where considerably high pressures are generally employed.

Moreover, the membranes of this invention are particularly efficient in various separation and concentration processes, in which the reverse osmosis principle may be applied, such as for instance: purification of waste waters, recovery of dissolved inorganic substances, recovery of dissolved organic substances, treatment of foodstuff solutions, such as: milk, coffee, tea, citrus fruit juices, whey, tomato juice, sugar solutions; separation of azeotropes, separation and concentration of biological and pharmaceutical products, such as: hormones, proteins, vitamins, antibiotics, vaccines, aminoacids; and other similar processes.

DESCRIPTION OF THE PREFERRED EMBODIMENTS

The following examples are given to better illustrate the invention, without, however limiting same.

EXAMPLE 1

Preparation of a copolyamide (VI) starting from the dichloride of 1,2,5-thiodiazol-3,4-dicarboxylic acid and the dichloride of isophthalic acid, according to an 80/20 molar ratio, and from trans-2,5-dimethylpiperazine.

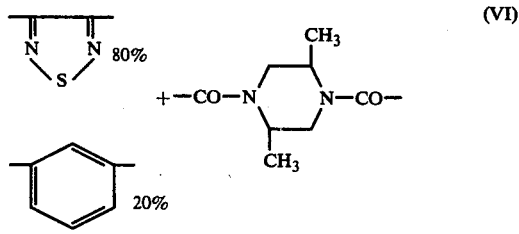

(VI)

A solution made up of 1,100 ml of H₂O, 50.88 g of Na₂CO₃ and 22.8 g of trans-2,5-dimethylpiperazine was admixed, under intense stirring, with a solution consisting of 150 ml of CH₂Cl₂, 33.75 g of the dichloride of 1,2,5-thiodiazol-3,4-dicarboxylic acid and 8.12 g of isophthaloyl dichloride.

Stirring was carried on for about 15 minutes, after which the CH₂Cl₂ was evaporated off under vacuum. A white product separated, which, after filtering and several washings with hot water, and then acetone, was dried under vacuum at 80° C. The yield was 88.6% and the inherent viscosity was 3.1 (determined at 30° C., in a solution of 0.5 g of polymer in 99.5 g of 98% sulphuric acid).

EXAMPLE 2

Preparation of a copolyamide (VII) starting from the dichloride of 1,2,5-thiodiazol-3,4-dicarboxylic acid and the dichloride of isophthalic acid, according to a 50/50 molar ratio, and from trans-2,5-dimethylpiperazine.

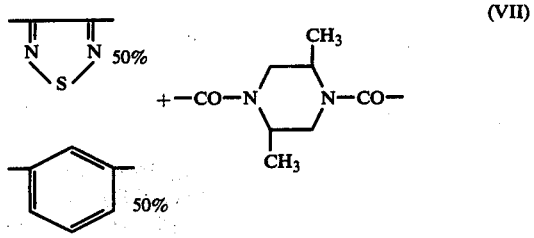

A solution consisting of 150 ml of $CH_2Cl_2$, 21.1 g of the dichloride of 1,2,5-thiodiazol-3,4-dicarboxylic acid and 20.3 g of isophthaloyl dichloride was admixed under intense stirring with a solution containing 1,100 ml of water, 50.88 g of $Na_2CO_3$ and 22.8 g of trans-2,5-dimethyl piperazine.

Stirring was carried on for about 15 minutes, after which the methylene chloride was removed by evaporation under vacuum.

A white product separated which, after filtering and several washings with hot water and then with acetone, was dried under vacuum at 80° C.

The obtained polymer had a yield of 97% and an inherent viscosity of 4.26 (measured at 30° C. in a solution of 0.5 g of polymer in 99.5 g of 98% $H_2SO_4$).

EXAMPLE 3

Preparation of a copolyamide (VIII) starting from the dichloride of 1,2,5-thiodiazol-3,4-dicarboxylic acid and the dichloride of orthophthalic acid according to a 70/30 molar ratio, and from trans-2,5-dimethyl-piperazine.

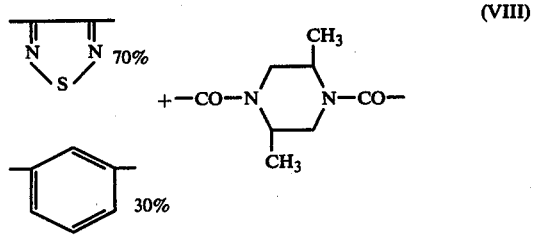

A mixture was prepared of 680 ml of $H_2O$, 100 ml of $CH_2Cl_2$, 26 g of trans-2,5-dimethyl-piperazine, 16 g of NaOH and 80 ml of a 5% solution of Duponol ME (Du Pont).

This mixture was admixed, under intense stirring, with a solution consisting of 100 ml of $CH_2Cl_2$, 29.5 g of the dichloride of 1,2,5-thiodiazol-3,4-dicarboxylic acid and 12.18 g of orthophthaloyl dichloride.

Stirring was carried on for about 15 minutes, after which methylene chloride was evaporated off under vacuum with heating. The white product thus obtained was filtered, washed with 1 liter of Cellosolve (Carlo Erba) and then repeatedly washed with hot water and finally with acetone.

After drying under vacuum at 100° C., 36 g of polymer were recovered, having an inherent viscosity of 0.64 (measured at 30° C. in a solution of 0.5 g of polymer in 99.5 g of 98% $H_2SO_4$).

EXAMPLE 4

A. Preparation of a membrane of the copolyamide (VI) obtained according to Example 1

13.5 g of copolyamide (VI) were suspended, at room temperature, in 86.5 g of a solution containing 82.15 g of N-methyl pyrrolidone and 4.35 g of LiCl. The suspension was heated to 140° C. under stirring, and the copolyamide rapidly dissolved. The limpid, transparent solution was filtered at a temperature of 95° C. through a filter having a porosity of 5 μ and then deareated, heated to 50° C. and spread onto an 0.2 cm thick glass plate, in order to form a film having a thickness of 0.045 cm.

Thereupon the glass plate was heated on an electric heater (Platoterm, Bicasa, Milan) at 120° C. for 10 minutes. The glass plate was then cooled to room temperature in 90 seconds and immersed in a vessel containing a water and ice slurry.

After about 10 minutes of immersion in the water and ice, the membrane could be removed from the glass plate; it was kept in water and ice for a further 50 minutes and then preserved in water at room temperature.

This membrane had a positive and negative side. By positive side is meant the membrane face opposite to the glass plate during the membrane preparation process. By negative side is meant the membrane face in contact with the glass plate during said preparation process. This membrane had a water content of about 64% by weight.

B. Use of the membrane, not subjected to a heat treatment, in a reverse osmosis process (positive side).

The membrane prepared as described hereinabove was placed into a reverse osmosis cell of a standard type, wherein an aqueous solution containing 10,000 ppm of sodium chloride was circulated.

The membrane was placed into the cell, taking care that the face turned to the solution to be desalted was the positive side. The saline solution was then brought to a pressure of 80 atm. The water flow amounted to 1340 liters/sq.m.d.; the extent of saline rejection was about 64%, corresponding to a NaCl concentration of 3600 ppm in the water which passed through the membrane.

EXAMPLE 5

A membrane prepared according to Example 4 A was subjected to heat treatment by immersion in water at 80° C. for 30 minutes.

After this treatment the water content of the membrane amounted to 58% by weight. The membrane was placed into a reverse osmosis cell according to the technique described in Example 4 B, with the following results being obtained: water flow = 670 liters/sq.m.d.; saline rejection = 97.2% (280 ppm of NaCl in the water which passed through the membrane); membrane constant = 9.3 liter/sq.m. d.atm.

EXAMPLE 6

A membrane prepared according to the techniques described in Example 4 and heat-treated according to Example 5 was placed into a reverse osmosis, standard-type cell, wherein an aqueous solution containing 10,000 ppm of sodium chloride was circulated. The membrane was placed into the cell taking care that the negative side thereof was in contact with the solution to be desalted. The saline solution was then brought to a pressure of 80 atm.

The water passing through the membrane contained 9400 ppm of NaCl, the saline rejection was practically negligible and the water flow amounted to 1,050 liter/sq.m. d.

The purpose of this example is to illustrate the anisotropic characteristics of the structure of these membranes.

EXAMPLE 7

A membrane prepared according to Example 4 A was subjected to heat treatment by immersion in water at 90° C. for 30 minutes. After such treatment the water content amounted to 55% by weight.

This membrane, placed into a reverse osmosis cell following the procedure of Example 4 B, resulted in a flow of 350 liter/sq.m.d, a saline rejection of 99.4% (60 ppm of NaCl in the water passed through the membrane) and a membrane constant of about 4.3 liter/sq.m. d. atm.

EXAMPLE 8

Following the procedure described in Example 4, a solution was prepared containing 10 g of copolyamide (VII) (prepared according to Example 2), 85.5 g of N-methyl pyrrolidone and 4.5 g of lithium chloride.

The transparent and limpid solution was filtered at 95° C. through a filter having a porosity of 5 $\mu$.

The deaerated solution was heated to 50° C. and spread onto a 0.2 cm thick glass plate in order to form a film having a thickness of 0.045 cm. The glass plate was heated in an electric heater (Platoterm, Bicasa, Milan) at 120° C. for 15 minutes. The glass plate was then cooled to room temperature in 90 seconds and immersed in a water-ice bath.

After about 10 minutes of immersion the membrane could be removed from the glass plate. It was kept in water and ice for a further 50 minutes, and then subjected to heat treatment in water at 80° C. for 30 minutes and preserved in water at room temperature. As a result of the heat treatment, the water content of the membrane decreased from 59.3 to 44.8% by weight.

The thus obtained membrane was placed into a standard-type reverse osmosis cell, following the procedure of Example 4 B. The cell was fed with an aqueous solution containing 35,000 ppm of NaCl (synthetic sea water), which was circulated at a pressure of 105 atm. The water passing through the membrane contained 280 ppm of NaCl (saline rejection = 99.2%) and the water flow amounted to 300 liter/sq.m. d. The membrane constant was 3.92 liter/sq.m. d. atm.

EXAMPLE 9

10 g of copolyamide (VIII) prepared according to Example 3 were suspended in 90 g of a solution made up of 85.5 g of N-methyl pyrrolidone and 4.5 g of lithium chloride. The suspension was heated to 160° C. under stirring and rapid dissolution of the copolymer took place. The transparent limpid solution obtained was filtered at a temperature of 95° C. through a filter having a porosity of 5 $\mu$. The deaerated solution was heated to 60° C. and spread on a 0.2 cm thick glass plate in order to form a film having a thickness of 0.045 cm. The glass plate was heated on an electric heater (Platoterm, Bicasa, Milan) at 120° C. for 10 minutes.

The glass plate was then cooled to room temperature in 90 seconds and immersed in a water-ice bath.

After about 10 minutes of immersion the membrane could be removed from the glass plate. The membrane was kept in water and ice for a further 50 minutes, and was then subjected to a heat treatment in water at 80° C. for 30 minutes and preserved in water at room temperature. The heat treatment caused the water content of the membrane to decrease from 73 to 65% by weight. The membrane thus prepared was placed into a standard-type reverse osmosis cell following the procedure of Example 4 B. The cell was fed with an aqueous solution containing 5,000 ppm of NaCl; the saline solution was circulated at a pressure of 50 atm. The water passing through the membrane contained 300 ppm of NaCl (saline rejection = 94%) and the water flow amounted to 660 liter/sq.m. d. The membrane constant is 14.3 liter/sq.m. d.atm.

EXAMPLE 10

Following the procedure of Example 4, a solution was obtained which contained 12 g of copolyamide (VI), prepared according to Example 1 and characterized by an inherent viscosity ($\eta$ in) = 4.42 (determined at 30° C. in a solution made up of 0.5 g of polymer in 99.5 g of 98% $H_2SO_4$), 86.6 g of N-methyl-pyrrolidone and 4.4 g of lithium chloride.

The deaerated solution was heated to 50° C. and spread onto a 0.2 cm thick glass plate to form a film having a thickness of 0.045 cm. This glass plate was heated on a Platoterm heater (manufactured by Bicasa) at 120° C. for 10 minutes, and cooled to room temperature for 90 seconds after which it was immersed in a water-ice bath.

The membrane was kept in water and ice for 50 minutes, subsequently subjected to a heat treatment in water at 80° C. for 30 minutes and then preserved in water at room temperature. This heat treatment caused the water content of the membrane to decrease from 64% to 56% by weight.

The thus obtained membrane was placed into a standard-type reverse osmosis cell. Another cell of the same type was equipped with a cellulose acetate membrane RO-97 produced by Eastman Kodak. Both cells were fed with an aqueous solution containing 10,000 ppm of NaCl and circulated at a pressure of 60 atm.

The comparative test was conducted for 410 hours. The course and extent of saline rejection flow is shown in the drawing.

At the conclusion of this test, the membrane prepared according to this Example, and indicated on the drawing by reference numeral 1, had a flow of 350 liter/sq.m. day and a saline rejection equal to 97.2%. The cellulose acetate membrane, reference numeral 2, had, after the same time period, a flow of 290 liter/sq.m. day and a saline rejection of 95.7%.

This test proves that, under equal conditions, the membranes according to the present invention are decidedly superior to the cellulose acetate membranes.

Variations can, of course, be made without departing from the spirit and scope of our invention.

Having thus described our invention what we desire to secure by Letters Patent and hereby claim is:

1. Polypiperazine amide reverse osmosis anisotropic-gel membrane consisting essentially of the repeating unit having the formula (I):

$$-(-A-Q-)_n \qquad (I)$$

wherein n is a whole number sufficiently high to impart to the polymer a molecular weight suitable for the formation of a membrane; —A— is a divalent organic radical having the structure (II):

$$-CO-N\underset{R_x}{\diagdown}N-CO-$$

wherein

[piperazine ring: N-N]

is a divalent piperazine ring, x is a whole number between 0 and 8 and R is a lower alkyl group; said R groups, when present in the piperazine ring in a number greater than 1, being placed in any steric position with respect to the ring; —Q— is at least two divalent organic radicals selected from the group consisting of the formulae:

$$-C\!=\!\!=\!\!=\!\!C- \atop N\diagdown_Y\diagup N \qquad (III)$$

wherein Y is O or S:

[benzene ring] (IV)

and

[o-substituted benzene ring] (V)

with the proviso that at least 5 mol % of the —Q— groups are of formula (III).

2. A membrane according to claim 1, wherein R is methyl or ethyl.

3. A membrane according to claim 1, wherein R is methyl, x is 2 and Y is S.

4. A membrane according to claim 1 wherein —Q— is a mixture of 80 mole % of

[thiadiazole ring]

and 20 mole % of

[benzene ring]

5. A membrane according to claim 1 wherein —Q— is a mixture of 50 mole % of

[thiadiazole ring]

and 50 mole % of

[benzene ring]

6. A membrane according to claim 1 wherein —Q— is a mixture of 70 mole % of

[thiadiazole ring]

and 30 mole % of

[o-substituted benzene ring]

* * * * *

UNITED STATES PATENT OFFICE
CERTIFICATE OF CORRECTION

Patent No. 4,129,559             Dated December 12, 1978

Inventor(s) LINO CREDALI et al

It is certified that error appears in the above-identified patent and that said Letters Patent are hereby corrected as shown below:

Column 3, line 58: Change "may be" to -- may sometimes be --.

Column 6, line 21: "then" should read -- them --.

Column 7, lines 51-55:

" 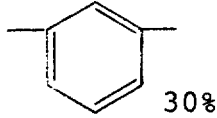 "     should read -- 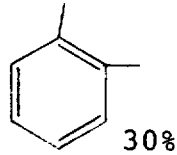 --.

Signed and Sealed this

Twenty-sixth Day of February 1980

[SEAL]

Attest:

SIDNEY A. DIAMOND

Attesting Officer     Commissioner of Patents and Trademarks